INVENTORS
WARREN D. NUTTEN &
BERNARD C. PHILLIPS
BY
Harry O. Ernsberger
ATTORNEY United States Patent Office 3,353,525
Patented Nov. 21, 1967

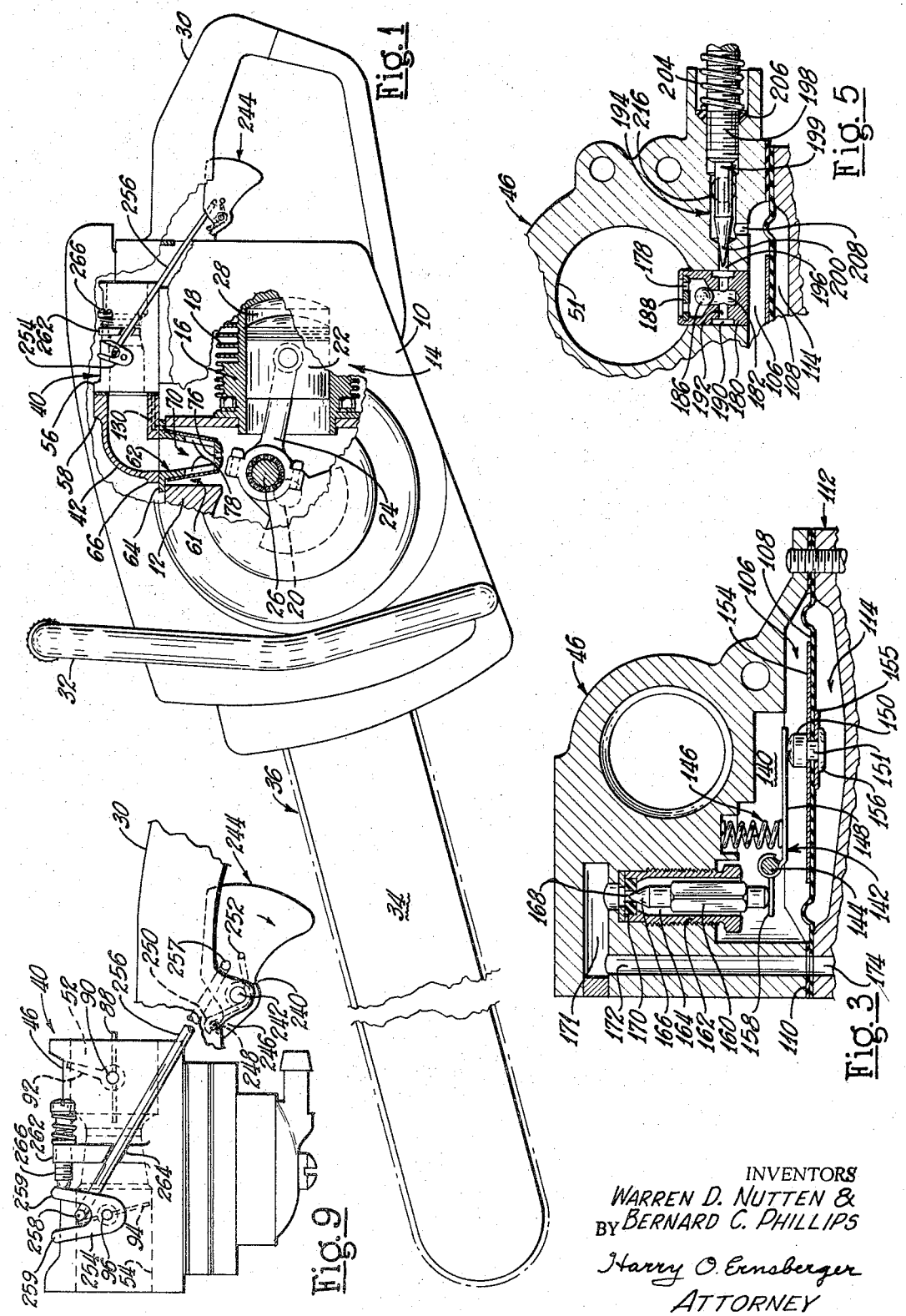

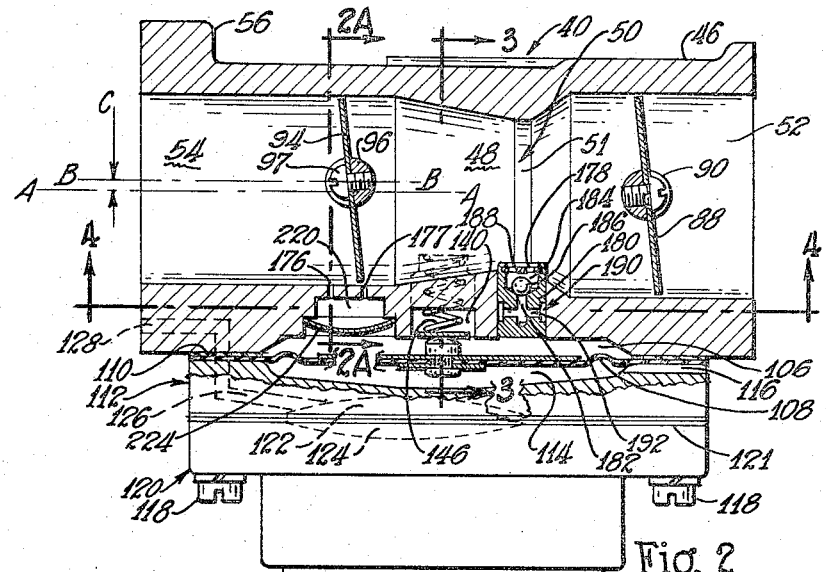
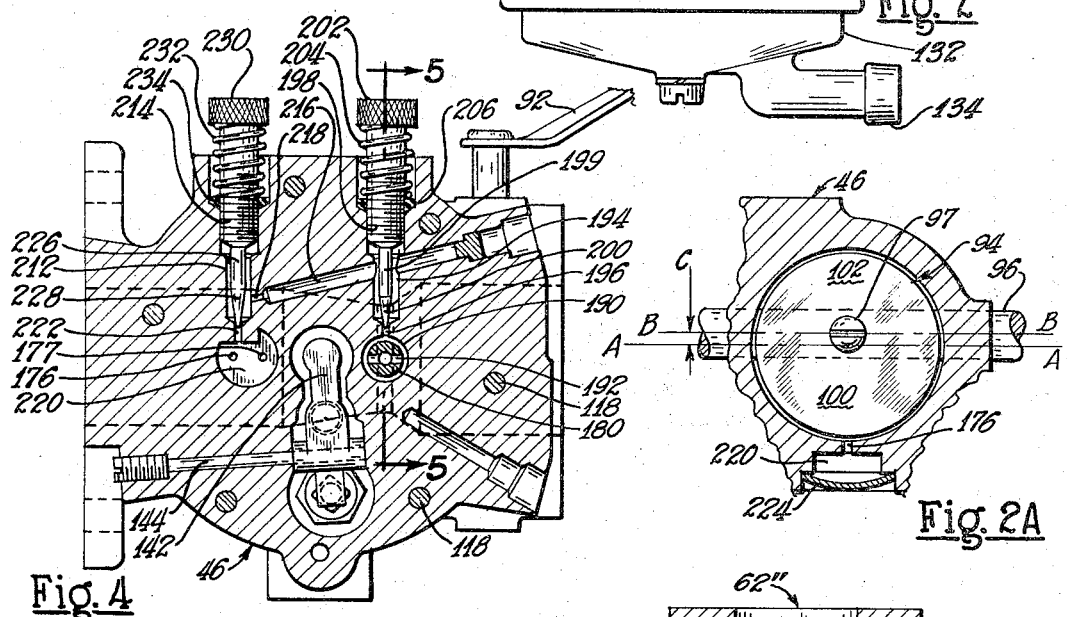
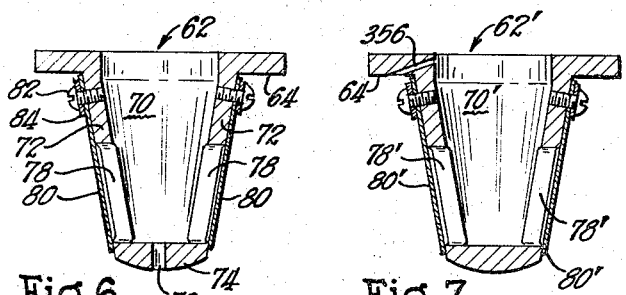
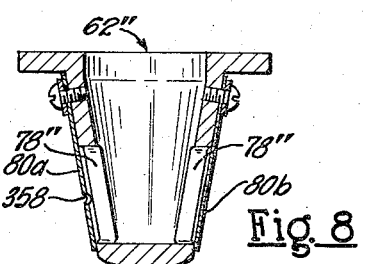

3,353,525
FUEL FEED SYSTEM AND THROTTLE CONTROL FOR INTERNAL COMBUSTION ENGINES
Warren D. Nutten, Erie, Mich., and Bernard C. Phillips, Toledo, Ohio, assignors to The Tillotson Manufacturing Company, Toledo, Ohio, a corporation of Ohio
Filed Sept. 7, 1965, Ser. No. 485,189
12 Claims. (Cl. 123—119)

This invention relates to fuel feed system and throttle control for an internal combustion engine and more especially to a system and method of influencing the position of a throttle valve by fluid pressure automatically to regulate fuel delivery to an engine to prevent stalling of the engine at idling speeds.

Engines of the two cycle or two stroke type have been used extensively for powering various devices such as chain saws, lawn mowers, small boats and other uses where a comparatively lightweight power unit is desirable. In the operation of a two cycle engine, fuel and air mixture is admitted direct from a carburetor or charge forming device into the engine crankcase for subsequent compression and delivery into the engine cylinder in a conventional manner where the mixture is ignited, such engines providing a power stroke during each revolution of the engine crankshaft.

Such engines embody unidirectional valve or obturator means to admit fuel and air mixture from the carburetor into the crankcase at some period during a compression stroke of the piston in the cylinder establishing suction in the crankcase, and prevent reverse flow of mixture to the carburetor during a power stroke of the piston which compresses the mixture admitted into the crankcase.

Certain difficulties have been encountered in endeavoring to operate engines of this character at idling speeds in a manner to prevent stalling. Where two cycle engines are employed for powering chain saws, engine idling is imperative in order that the speed responsive automatic clutch between the engine crankshaft and the saw chain be disengaged at engine idling speeds. The valve or obturator means associated with the crankcase providing for unidirectional movement of mixture into the crankcase is opened on the stroke of the piston establishing suction or reduced pressure in the crankcase and fuel and air mixture is delivered past the valve into the crankcase. As the mixture contains atomized particles of liquid fuel, the fuel particles are impinged on the moving components in the engine crankcase such as the crankshaft, crankshaft counterweights and the connecting rod rotating at high speed under normal engine operation, and some of the particles or droplets of liquid fuel, engaging these moving parts, are thrown outward and tend to collect on the inner wall surface of the engine crankcase.

By reason of this action, normal delivery of the fuel into the engine cylinder may be impaired or retarded to a certain extent. Under normal engine speeds with the throttle substantially opened, a substantial amount of air flows through the mixing passage of the carburetor or charge forming device into the engine crankcase and hence there is sufficient turbulence of air and fuel mixture in the crankcase to minimize accumulation of liquid fuel in the crankcase. However, in a two cycle engine it is usual that the interior surfaces of the crankcase are wetted with fuel which, under normal engine operation, does not appreciably modify the fuel and air mixture conveyed from the crankcase to the engine cylinder through the usual bypass port arrangement of conventional construction. If the throttle in the mixing passage of the carburetor is rapidly closed, the vacuum or reduced pressure in the engine crankcase increases substantially and this causes the light fractions or distillates of the liquid fuel particles to vaporize quickly and overenrichens the metered idle mixture entering the crankcase from the carburetor. This temporarily-enrichened mixture delivered to the engine cylinder usually causes stalling of the engine. Two cycle engines of the character and horsepower employed for powering portable chain saws are comparatively small and are necessarily equipped with lightweight fly wheels to reduce the over-all weight of the power units to a minimum. Hence the low momentum of a lightweight fly wheel rotating at engine idling speed is of little assistance in overcoming stalling when the mixture in the cylinder fails to ignite.

Still another characteristic of two cycle engines tends to impair engine idling. In the operation of a two cycle engine, a substantial amount of residual exhaust or burned gas remains in the combustion chamber upon the completion of a power stroke. This residual exhaust gas in the combusion chamber or cylinder dilutes the incoming fuel and air mixture and further retards or impairs combustion at idling speeds.

The present invention relates to a fuel feed system or method particularly for a two cycle engine wherein pressures in the engine crankcase are caused to influence the operation of the throttle valve in the mixing passage of the carburetor to modify the position of the throttle and thereby compensate for abnormal mixture conditions in the crankcase to effect delivery to the combustion chamber or cylinder of a combustible mixture of a character to assure engine idling and prevent stalling of the engine at idling speeds.

Another object of the invention is the provision of a system or method of delivering fuel and air mixture to the crankcase of a two cycle engine involving a bypass arrangement or port between the engine crankcase and the mixing passage of the carburetor and an unbalanced throttle valve in the carburetor wherein the throttle valve when in normal engine idling position is influenced by crankcase pressure effective through the bypass upon differential areas of the throttle valve to change the relative position of the throttle valve to assure delivery of combustible mixture into the combustion chamber or cylinder to prevent stalling of the engine.

Another object of the invention is the provision of a throttle valve mounted in a mixing passage of a carburetor in a manner providing for limited unrestricted movement adjacent engine idling position so as to be automatically opened slightly by gas pressure in the engine crankcase in the event that the engine tends to stall.

Another object of the invention is the provision of a charge forming device or carburetor having a mixing passage for delivering fuel to a two cycle engine, the mixing passage being equipped with relatively movable throttle means mounted to provide regions of different areas subjected to pressure from the engine crankcase whereby the position of the throttle means is modified by pressure on the region of larger area to effect scavenging of the engine crankcase of overrich mixtures to prevent stalling of the engine.

Another object of the invention is the provision of a carburetor having a mixing passage equipped with a throttle valve movable about an axis offset from the axis of the mixing passage to provide differential areas of the throttle valve at the respective sides of the throttle axis whereby fluid pressure from the engine crankcase conveyed through a bypass acts on the differential areas of the throttle valve to effect opening or closing movements of the throttle valve to compensate for abnormal mixtures in the crankcase and promote sustained engine idling.

Still another object of the invention is the provision of a system or method of feeding fuel and air mixture to the crankcase of a two cycle engine wherein throttle means in the mixing passage of the carburetor is under constant influence of crankcase pressures through a restricted bypass whereby to maintain sustained idling operation in all positions of the engine and carburetor without the use of springs or other mechanical biasing devices.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of a chain saw construction powered by a two cycle engine illustrating one form of apparatus associated therewith for performing the method of the invention;

FIGURE 2 is a longitudinal sectional view of a charge forming device or carburetor embodying a form of apparatus of the invention;

FIGURE 2A is a transverse sectional view taken substantially on the line 2A—2A of FIGURE 2;

FIGURE 3 is a transverse sectional view through the carburetor construction, the view being taken substantially on the line 3—3 of FIGURE 2;

FIGURE 4 is a sectional view taken substantially on the line 4—4 of FIGURE 2;

FIGURE 5 is a fragmentary sectional view taken substantially on the line 5—5 of FIGURE 4;

FIGURE 6 is a sectional view of a valve or obturator construction disposed in a mixture inlet passage in the wall of the engine crankcase illustrating one form of bypass construction;

FIGURE 7 is a sectional view similar to FIGURE 6 illustrating another form of bypass construction;

FIGURE 8 is a sectional view similar to FIGURE 6 showing a further form of bypass construction;

FIGURE 9 is an elevational view of the carburetor illustrating a manual throttle control mechanism;

Figure 10:
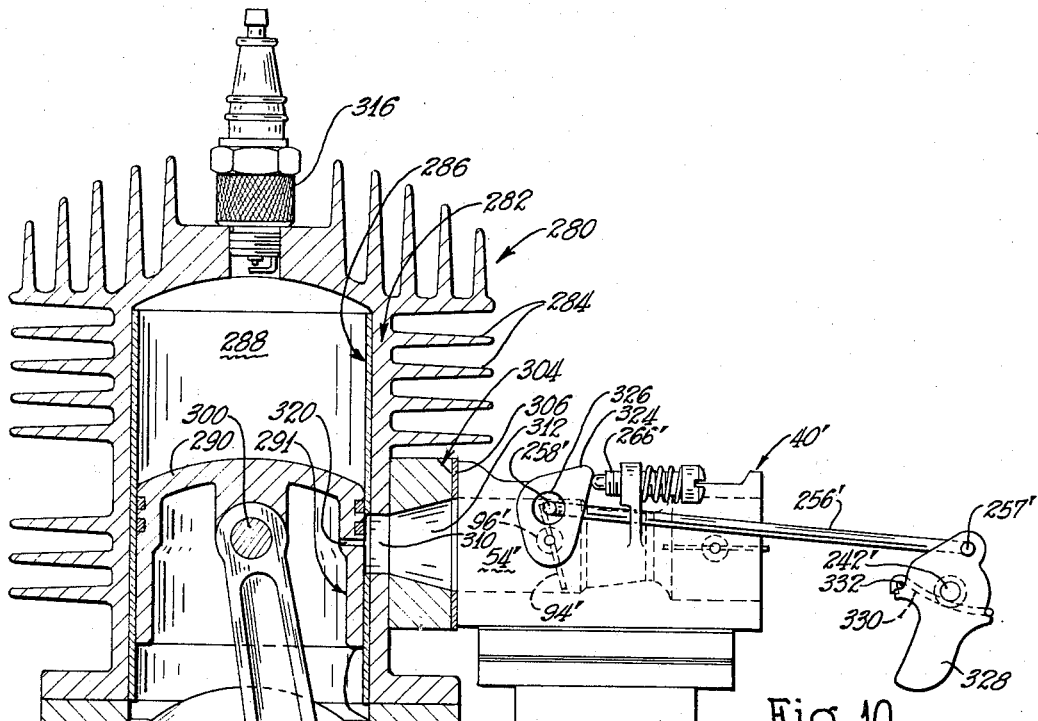
FIGURE 10 is a sectional view of a conventional two cycle engine of the three port type in combination with a charge forming apparatus or carburetor for carrying out the method of the invention.

While the fuel feed system and arrangement of the invention is illustrated in association with a two cycle engine adapted for powering a portable chain saw, it is to be understood that the fuel feed system and method of the invention may be utilized with two cycle engines generally and particularly with engines where it is essential to provide against stalling of the engine under engine idling conditions.

Referring to the drawings in detail and initially to FIGURE 1, there is illustrated an internal combustion engine driven chain saw of conventional construction. The arrangement is inclusive of a housing or frame 10 on which is supported a crankcase 12 of a two cycle engine 14 of the air cooled type wherein the walls of a cylinder 16 are provided with cooling fins 18. The engine is equipped with a conventional crankshaft 20, a piston 22 reciprocable in the cylinder 16, the piston being connected by a connecting rod 24 with a crank pin 26 of the crankshaft 20.

A spark plug (not shown) is for igniting the fuel and air mixture in a combustion chamber or region 28 provided by the cylinder 16 above the piston 22. The engine cylinder is provided with a port or passage (not shown) for conveying fuel and air mixture from the crankcase 12 into the combustion chamber 28 in a conventional manner, the cylinder being provided with an exhaust port (not shown) of conventional type through which the exhaust gases are conveyed from the cylinder after each power stroke of the piston.

The frame construction 10 is equipped with handles or hand grip members 30 and 32 to facilitate manipulation of the chain saw by an operator. The frame construction 10 is equipped with a forwardly extending plate-like member 34 which provides a support and guide means for an endless or chain-type saw construction 36, illustrated schematically in FIGURE 1, the forward end of the member 34 being equipped with a conventional sprocket (not shown) which engages the saw chain.

The saw chain 36 engages a second sprocket (not shown) driven by the engine crankshaft 20 through an automatic clutch mechanism (not shown) of conventional construction for actuating the saw chain. The automatic clutch mechanism is of a conventional centrifugal type which automatically establishes an operative drive connection between the engine crankshaft 20 and the saw chain drive sprocket at normal engine speeds, the clutch mechanism automatically disconnecting the drive connection with the crankshaft 20 when the engine speed is reduced to idling speed. This construction and operation of the chain saw are conventional.

The fuel feed system and arrangement of the invention are inclusive of a charge forming device or carburetor 40 which is connected with an intake manifold or tubular coupling 42 mounted by the engine crankcase 12, as shown in FIGURE 1. The carburetor 40 is preferably of the diaphragm type shown herein, but it is to be understood that a so-called float-type carburetor embodying the invention may be utilized as a component in the fuel feed system for use with two cycle engines which are not subjected to extreme angular or inverted positions in use.

The diaphragm carburetor illustrated includes a body or body member 46 fashioned with a mixing passage 48 of circular cross section, the mixing passage 48 including a Venturi 50 having a restricted region or choke band 51, an air inlet region 52, and a mixture outlet region 54. The carburetor body 46 at the mixture outlet end is fashioned with a mounting flange 56 which is bolted or otherwise secured to a flange portion 58 of the intake manifold or tubular coupling 42.

In the embodiment illustrated in FIGURE 1, the manifold or tubular coupling 42 is of L-shaped configuration. The wall of the crankcase 12 is fashioned with an opening 61 accommodating a valve supporting means or member 62 having a flange 64 which engages the exterior of the crankcase wall surface surrounding the opening accommodating the member 62. The manifold or tubular coupling 42 is fashioned with a flange 66, which engages the flange 64 in the manner shown in FIGURE 1.

Securing means such as bolts (not shown) project through openings in the flanges 64 and 66 and into threaded openings in the crankcase wall to secure the flange 66 of the manifold 42 and the flange 64 in assembled relation with the crankcase, as shown in FIGURE 1. The valve supporting member 62 is fashioned with a hollow interior 70 which registers with the tubular interior of the manifold or coupling 42 for conveying fuel and air mixture from the mixture outlet 54 of the carburetor into the engine crankcase.

The valve supporting member or valve cage 62 is illustrated in FIGURE 6 and includes convergingly or angularly arranged walls 72 integrally joined with an end wall 74, the latter having a restricted passage or opening 76 therethrough for a purpose to be hereinafter explained. The converging walls 72 are fashioned with ports or openings 78. Disposed in contiguous relation with an exterior surface of each of the walls 72 is a valve member 80 preferably of the reed type viz a comparatively thin spring-like member or strip which is highly flexible.

Each valve member or reed 80 is secured to the upper region of the adjacent wall 72 by means such as bolts 82 with a washer 84 disposed between the head of each bolt and the adjacent reed valve. Each of the reed valves 80 is fashioned to normally engage the adjacent surface of a wall 72 in order to close the adjacent port or opening 78 in the member 72.

The reed valves 80 are comparatively thin, being between six thousandths and twelve thousandths of an inch whereby slight reduced pressure in the engine crankcase causes the reed valves 80 to open to admit fuel and air mixture from the carburetor mixing passage into the engine crankcase when reduced pressure or suction is established in the crankcase by upward movement of the piston 22. In the form shown in FIGURE 6 the reed valves 80 are of conventional construction of the type usually used in two cycle engine constructions.

The air inlet end 52 of the carburetor 40 is preferably equipped with an air filter (not shown) of conventional construction. Disposed in the air inlet region 52 is a choke valve 88 mounted upon a shaft 90 journaled in diametrically arranged bores provided in the walls of the carburetor. The one end of the shaft 90 exterior of the carburetor 40 is equipped with an arm 92 for manually opening and closing the choke valve for engine starting purposes.

Disposed in the mixture outlet region 54 of the mixing passage is a circular disc type throttle valve 94 mounted upon a shaft 96 by means of a securing screw 97. The central longitudinal axis of the mixing passage, which is of circular cross section, is indicated by the line A—A in FIGURES 2 and 2A. The axis of the throttle supporting shaft 96 is on a line B—B which is offset from the central axis A—A by the distance indicated at C. The distance C may vary with the size of the engine but is usually between .015 and .100 of an inch. The throttle supporting shaft 96 is journaled in suitable bores formed in the adjacent regions of the wall of the carburetor defining the mixing passage.

Through this construction the surface area 100 of the valve 94 below the axis C of the shaft 96 is greater than the area of the region 102 of the valve disc above the axis C viz the center line of the throttle shaft 96. Thus air or mixture of fuel and air in the engine crankcase exerted in a right-hand direction against the throttle valve 94 in the position illustrated in FIGURE 2 tends to open the throttle valve because the area 100 of the valve below the center line C of shaft 96 is greater than the area or region 102 above the center line of the shaft. The purpose of this construction will be hereinafter explained in further detail.

The carburetor body 46 is formed with a comparatively shallow recess providing a fuel chamber 106 of generally circular configuration, and a flexible membrane or diaphragm 108 extends across the chamber 106 providing a flexible wall of the chamber.

An annular gasket 110 is disposed between a planar surface of the carburetor body 46 and the diaphragm 108. A substantially circular member 112 is disposed beneath the diaphragm 108 and is fashioned with a central circular recess 114 providing a space accommodating movements of the flexible diaphragm 108. The space 114 is vented to the atmosphere by a vent passage 116. If desired, the space 114 may be vented into the inlet end 52 of the mixing passage. Either method of venting the space beneath the diaphragm is conventional.

The annular region of member 112, defining the generally circular recess 114, is engaged with the peripheral region of the diaphragm 108. Disposed beneath the member 112 is a member 120 and positioned between members 112 and 120 is a pumping diaphragm 121 for pumping fuel from a fuel supply to the carburetor. The members 112 and 120, diaphragms 108 and 121 and gasket 110 are provided with openings which receive securing screws 118 which extend into threaded openings in the carburetor body 46 for securing the diaphragms in assembled relation with members 112, 120 and the carburetor body 46.

The fuel pump construction is of the character shown in Phillips Patent No. 2,796,838. The member 112 is fashioned with a pumping chamber 122 and the member 120 fashioned with a fuel chamber 124 both being illustrated in broken lines in FIGURE 2.

A pulse or pumping passage 126 in communication with the pumping chamber 122 is in communication with the engine crankcase through a connecting passage 128 of pulse passage 126 in the carburetor body 46 and a passage 130 in member 42, shown in broken lines in FIGURE 1, which is in registration with passage 128 and opens into the crankcase by way of an opening through the flange 64 on the reed valve support member 62.

The varying fluid or gas pressures developed in the crankcase are communicated through the interconnecting passageways to flex the pumping diaphragm 121 and thereby effect a pumping action. A member 132 secured to member 120 contains fuel passages and a strainer for straining the liquid fuel, the member 132 having a nipple portion 134 adapted to be connected by tubular means (not shown) with a fuel supply. The fuel supply may be a tank (not shown) contained within the housing frame structure 10 or may be supported by the housing and exteriorly thereof.

The pumping diaphragm 121 is fashioned with integral flap valves (not shown) providing inlet and outlet valves whereby the flexing of the diaphragm 121 under the influence of varying fluid pressures in the pulsing chamber 122 pump fuel from the supply to the carburetor. The diaphragm 108 forming a wall of the fuel chamber 106 is preferably made of highly flexible material such as a comparatively thin impervious resin film or may be of fine mesh fabric coated with a suitable resinous material to render the diaphragm impervious.

The carburetor is illustrated in detail in FIGURES 2, 3 and 4. Disposed within a recess 140 forming a part of the fuel chamber 106 is a lever 142 pivoted or fulcrumed intermediate its ends upon a fulcrum pin or shaft 144 removably secured within the chamber 106. Positioned as close as practicable to the fulcrum pin 144 is an expansive coil spring 146 normally biasing the lever for clockwise movement about the fulcrum pin as viewed in FIGURE 3. The distal end of the long arm 148 of the lever 142 is adapted to be engaged by a head 150 of a rivet or member 151 mounted at the central region of the diaphragm 108.

Reinforcing discs 154 and 155 are disposed at opposite sides of the diaphragm 108, the rivet 151 extending through registering openings in the reinforcing discs 154 and 155 and the diaphragm, the rivet being swaged as at 156 to secure the discs and diaphragm in assembled relation. The lever 142 is fashioned with a short arm 158 which is adapted for engagement with an end of a fuel inlet valve body 160 shown in FIGURE 3.

The carburetor body 46 is formed with a threaded bore accommodating a threaded fitting or valve guide member 162 of sleeve-like shape having an interior bore 164 in which the inlet valve body 160 is disposed for relative slidable movement.

The valve body 160 is of triangular or rectangular cross section to facilitate fuel flow past the valve body into the fuel chamber 106. The valve member or body 160 is fashioned at its opposite end with a cone-shaped valve portion 166 extending into and cooperating with a port 168 provided by an annular valve seat member 170.

The valve seat member 170 is preferably of nonmetallic rubber-like material to secure effective sealing cooperation with the cone-shaped valve 168. The port 168 is in communication with interconnecting passages 171, 172 in the carburetor body 46 and the passage 174 in the member 112 which is in communication with an outlet flap valve (not shown) formed integrally with the pumping diaphragm 121 whereby fuel from the fuel chamber 124 of the fuel pumping means is conveyed into the fuel chamber 106 of the carburetor when the diaphragm-controlled inlet valve 166 is in open position.

The carburetor body 46 is fashioned with orifice means for delivering liquid fuel into the mixing passage 48 under the influence of aspiration or reduced pressure in the mixing passage for normal and high speed and engine idling operation. The carburetor is fashioned with a main or primary fuel delivery system which includes a main delivery orifice 178 opening into the restricted region or choke band 51 of the Venturi 50, as shown in FIGURE 2. The carburetor is fashioned with a secondary fuel delivery system which includes an idling orifice 176 and a low speed orifice 177. The engine idling orifice 176 is at the left-hand or downstream side of the throttle valve 94 as viewed in FIGURE 2.

The main orifice construction is inclusive of a cylindrically-shaped fitting 180 pressed or snugly fitted into a bore formed in the body 46 and fashioned with a central bore 182 which extends only partially through the fitting 180. The upper end of the fitting 180 is open providing the main fuel delivery orifice 178. The fitting is formed with a counterbore 184 containing a valve means or ball check valve 186. Disposed in the upper end of the counterbore 184 is a mesh-like member 188 to prevent dislodgement of the ball valve 186 but permitting fuel to flow out of the main orifice.

A circumferential recess 190 is formed in the member 180 and is in communication with the central bore 182 through radially arranged passages 192, shown in FIGURES 2, 4 and 5. Fuel conveying channels provided in the carburetor body 46 are illustrated in FIGURES 4 and 5. The body 46 is fashioned with a bore 194 in communication with the circumferential recess 190 in the fitting 180 by a restricted passage 196. The bore 194 has a threaded portion to receive a threaded portion of a valve member 198, the valve member having a tenon portion 199 terminating in a needle-shaped valve portion 200 extending into the restricted passage 196.

The valve member 198 is provided with a knurled head 202, an expansive coil spring 204 being disposed between an annular sealing gasket 206 and the knurled head to prevent leakage of fuel along the valve body.

The spring 204 establishes friction between the gasket 206 and valve member 198 to hold the valve 198 in manually adjusted position and to maintain the gasket 206 in sealing engagement with the valve body 198. The bore 194 is in communication with the fuel chamber 106 by fuel channel or passage 208, shown in FIGURE 5.

The manually adjustable valve member 198 regulates or meters fuel flow past the needle valve portion 200 through the restricted passage 196 for delivery through the main orifice 178. The carburetor is provided with means for regulating flow of fuel to the idling and low speed orifices 176 and 177. As shown in FIGURE 4, the carburetor body is fashioned with a bore 212 in which is disposed a second valve body 214 having a threaded portion engaged in a threaded portion of an extension of the bore 212.

The bore 212 is in communication with the bore 194 by means of a channel or bore 216 and a restriction 218. The bore 212 is in communication with a supplemental chamber 220 by means of a restricted passage 222. As shown in FIGURE 2, the supplemental chamber 220 is separated from the fuel chamber 106 by a Welch plug 224.

The valve member 214 is fashioned with a tenon 226 which terminates in a needle valve portion 228 cooperating with the restriction 222 for metering or regulating fuel flow into the supplemental or auxiliary chamber 220 for delivery through the engine idling orifice 176 and low speed orifice 177.

The valve member 214 is fashioned with a knurled head 230. An expansive coil spring 232 is disposed between a sealing gasket 234 and the knurled head to bias the seal in sealing relation with the valve member and to establish friction for maintaining the valve member 214 in manually adjusted position.

During normal or high speed operation of the engine with the throttle valve in open position fuel is delivered, under the influence of aspiration or reduced pressure in the mixing passage set up by air flow to the engine crankcase, from the chamber 106 through passage 208, bore 194, restricted passage 196, the circumferential recess 190, bore 182, past the ball check valve 186 and through the main orifice 178 into the choke band 51 of the Venturi 50 of the mixing passage.

When the throttle valve is in near closed or engine idling position, as illustrated in FIGURE 2, aspiration or reduced pressure at the downstream or left side of the substantially closed throttle valve 94, causes fuel flow for engine idling purposes from chamber 106 through passage 208, bore 216, restriction 218, bore 212 past the needle valve 228 and through the restriction 222 into the supplemental chamber 220 for delivery through the engine idling orifice 176, and through the low speed orifice 177 when the throttle valve is manually moved to a partially opened position for low speed engine operation.

Whenever the idle orifice 176 is delivering fuel into the mixing passage for engine idling, the ball check valve 186 is biased toward seating engagement with the valve seat or ledge at the open end of the bore 182 under the influence of engine aspiration effective through the idling orifice to prevent back bleeding of air from the mixing passage through the main orifice 178 into the fuel channels and prevent leaning of the fuel delivered to the engine idling orifice 176.

The inlet channel means 171, 172 is supplied with fuel under comparatively low pressure of about three pounds per square inch from the fuel pump so that fuel is always available at the carburetor inlet port 168 for delivery into the diaphragm fuel chamber 106 as regulated by the relative position of flexure of the diaphragm controlling the relative position of the inlet valve 166.

The throttle valve 94 is adapted to be operated by manual means for controlling the speed of the engine but the throttle operating mechanism is fashioned to provide for limited lost motion or free movement of the throttle valve 94 when the same is in or adjacent engine idling position. One form of manually operated means for moving the throttle valve 94 is illustrated in FIGURES 1 and 9.

Mounted upon a portion 240 of the hand grip portion 30 is a pin 242 which forms a pivotal support for a relatively movable trigger or throttle valve actuating member 244, the trigger having a projection 246 engageable with an abutment pin 248 when the valve 94 is in or adjacent engine idling position.

A coil spring 250 surrounds the pin 242, one end of the spring being hooked over the pin 248 as shown in FIGURE 9, and the other end 252 of the spring anchored in an opening provided in the trigger member 244. The spring 250 is tensioned so as to bias the trigger member 244 in a clockwise direction about the pivotal axis of the pin 242 to engage the projection 246 with the abutment pin 248. Secured on an end of the throttle shaft 96 and exteriorly of the carburetor body is a U-shaped member 254. A link or rod 256 is bent laterally at one end providing a portion 257 extending into an opening in the trigger or actuator 244 whereby the rod is pivotally connected with the trigger.

The opposite end of the rod 256 is bent laterally to provide a portion 258 which is loosely received in the bight portion of the member 254 between the furcations 259 thereof. As particularly shown in FIGURE 9, the trigger 244, link 256 and the throttle 94 are disposed in engine idling position with the throttle 94 being approximately in the position with respect to the idle orifice 176, as illustrated in FIGURE 2. As shown in FIGURE 9, the carburetor body 46 is provided with a lateral projection 262 provided with a guide slot or opening 264 which slidably accommodates the link or rod 256.

The slot 264 is disposed so that when the throttle valve 94 and member 254 are in approximate engine idling position, the portion 258 of the operating rod 256 is spaced a comparatively small distance from the furcations 259 whereby the throttle valve 94 has limited, unrestricted or free movement to an extent permitted by the clearance space between portion 258 of the rod 256 and the furcations 259. Through this arrangement and the off center position of the throttle shaft 96 from the axis of the mixing passage, fluid or gas pressure acting on the differential areas 100 and 102 of the unbalanced throttle 94 influences the position of the throttle for purposes hereinafter explained.

The projection 262 on the body 46 is provided with a threaded opening to accommodate a threaded member 266 which is adapted to be engaged by one of the furcations 259 to limit the closing movement of the throttle valve 94, the member 266 being manually adjustable to regulate the maximum closing position of the throttle valve toward engine idling position by the spring 250 acting on the trigger member 244.

The operation of the fuel feed system and carburetor of the invention is as follows: In starting the engine, the operator normally closes the choke valve 88 to the position shown in FIGURE 2 and opens the throttle 94 by movement of the trigger or throttle control member 244, pivoting the member 244 in a counterclockwise direction as viewed in FIGURES 1 and 9, the portion 258 of the rod 256 engaging the left-hand furcation 259, shown in FIGURE 9, to move the throttle to open position. When the engine is started, the choke valve 88 is moved to open position as illustrated in FIGURE 9.

The engine operates at normal and high speeds depending upon the relative amount of opening of the throttle valve 94 as controlled by the trigger 244. When it is desired to reduce the engine speed to idling, the operator releases pressure on the trigger 244 and the bias of the spring 250 returns the bifurcated member 254 and throttle 94 to engine idling position, the abutment screw 266 determining the engine idling position of member 254. The projection 246 on the trigger member 244 engages the abutment pin 248 to prevent further retractive movement of the trigger 244 and the rod 256.

In this position the end portion 258 of the rod 256 is free of engagement with the member 254, the clearance space between the portion 258 and the furcations 259 permitting limited, free or unrestricted movement of the throttle 94. During engine operation the reed valves 80 are automatically opened when the piston moves upward in the cylinder 16 by the reduced pressure thereby set up in the engine crankcase and fuel and air mixture is delivered from the carburetor into the engine crankcase.

The fuel for normal or high speed engine operation is delivered through the main orifice 178 into the Venturi under the influence of the aspiration or reduced pressure developed in the engine crankcase. During normal or high speed operation of the engine, the crankshaft and connecting rod in the crankcase are rotating at substantial speeds and some of the particles of liquid fuel in the fuel and air mixture are impinged by the rotating parts and thrown outwardly onto the inside wall of the crankcase.

Under open throttle conditions there is usually sufficient turbulence of the fuel and air mixture in the crankcase to retard a substantial accumulation of liquid fuel in the crankcase although there is always some wet fuel within the crankcase of a two cycle engine at all operating speeds. When the operator closes the throttle by release of pressure on the trigger 244, the reduced pressure or degree of vacuum in the crankcase immediately increases substantially.

This condition in the crankcase causes the light distillates or fractions of the residual liquid fuel in the crankcase to volatilize or vaporize very quickly and becomes an additive amount of volatilized fuel superimposed on or added to the idle fuel delivered through the idling orifice 176 and the small amount of air flowing past the edges of the nearly closed throttle valve, and this condition provides a temporary overrich mixture delivered from the engine crankcase to the combustion chamber of the cylinder. Such overrich mixture may not be ignited in the cylinder causing the engine to stall.

The stalling tendencies of a small two cycle engine are usually aggravated because the lightweight flywheel does not have sufficient momentum at low speed to counteract the stalling tendency.

At the completion of a power stroke of a piston in a two cycle engine, a substantial amount of residual exhaust or burned gases remains in the cylinder and this condition further reduces the possibility of igniting an overrich mixture as the residual inert exhaust gas further dilutes the incoming engine-idling mixture and prevents ignition or retards flame propagation and combustion to an extent that the engine will stall.

When the above-mentioned overrich mixture condition exists in the engine crankcase, on the downward stroke of the piston compressing the gas in the crankcase, the increased fluid or gas pressure in the crankcase communicated through the bypass opening 76 in the reed valve cage 62, shown particularly in FIGURE 6, exerts pressure or a pressure wave on the throttle valve 94 in a right-hand direction as viewed in FIGURES 1, 2 and 9. As the throttle presents unbalanced areas about its axis of rotation and the surface area 100 of the unbalanced throttle greater than the surface area 102 of the throttle, such pressure effects a slight opening movement of the throttle 94 to an extent permitted by the clearance space between one of the furcations 259 of member 254 and the portion 258 of the rod 256. This opening movement of the throttle slightly increases the amount of mixture which is delivered into the crankcase.

However, as soon as the engine speeds up slightly, the vacuum or reduced pressure in the tubular coupling or manifold 42 and mixture outlet region 54 of the carburetor is increased and, due to the differential areas of the throttle 94 at each side of the axis of the throttle shaft, the air pressure moving through the mixing passage tends to close the throttle to the idle speed condition for which the abutment screw 266 has been set. Thus, whenever the engine tends to stall with the throttle valve in near engine idling position the throttle automatically opens slightly to the extent of its free or unrestricted movement, promoting scavenging of the crankcase of its overrich mixtures and engine stalling thereby prevented.

If the engine idling mixture delivered by the carburetor is slightly overrich in fuel, the throttle valve position is automatically moved by differential pressures acting on the throttle valve to allow sufficient air to pass the nearly closed throttle into the engine to keep the engine running at idling speeds. While the herein described method of compensating for abnormal mixture conditions in the engine crankcase causes the engine to vary slightly in speed during engine idling conditions, the method is effective in preventing the engine from stalling without the use of springs or other mechanical means for changing the position of the throttle valve. Thus, alternate opening and closing movements may occur in succession until more normal mixture conditions exist in the crankcase and normal engine idling restored.

While the arrangement of the invention and the method of its operation are especially useful with a diaphragm type carburetor because it prevents stalling of the engine in any position including inverted position such as the positions in which chain saws are operated, the method and arrangement may be utilized with carburetors employing a float mechanism for controlling a fuel inlet valve in lieu of the fuel diaphragm control arrangement herein disclosed.

FIGURE 10 illustrates a modified form of the system of the invention which may be utilized with a two cycle engine of the character wherein the reciprocating piston of the engine exposes or uncovers a mixture inlet port in the cylinder wall when the piston is at the upper region of its stroke. An engine of this character and the carburetor for carrying out the method or system of the invention is illustrated in FIGURE 10. The two cycle engine 280 includes a cylinder construction 282 provided with cooling fins 284, the cylinder 282 being preferably provided with an interior liner 286 defining a combustion chamber 288, a piston 290 being reciprocable within the linear.

The engine crankcase 292 is secured through mating flanges with the cylinder construction 282. A crankshaft 294 is journaled in the crankcase and is equipped with a crank pin 296 connected by a connecting rod 298 with a wrist pin 300 carried by the piston 290.

Mounted on the side of the cylinder construction 282 is a tubular coupling or manifold 304 and a carburetor 40' of the same general character as the carburetor 40 hereinbefore described, the carburetor being secured to the coupling member 304 by suitable means (not shown), a gasket 306 being disposed between the engine cylinder and the manifold member 304.

The cylinder wall and the liner are provided with registering open areas providing a mixture into port 310 which registers with the mixture conveying passage in the coupling or manifold 304. In the two cycle engine construction shown in FIGURE 10, the piston per se functions as the valve means or obturator to admit fuel and air mixture through the port 310 into the region of the cylinder beneath the piston end into the crankcase 292. When the piston 290 is near its uppermost limit of travel in the cylinder, the terminal or end 314 of the skirt portion 291 of the piston is above the port 310 so as to establish communication between the mixture conveying passage 312 with the region below the piston.

Thus, as the piston moves upwardly on a compression stroke and reaches the upper region of its movement in an upward direction, reduced pressure is established beneath the piston so that mixture from the mixing passage in the carburetor 40' is caused to flow from the carburetor 40' through the manifold passage 312 and port 310 into the cylinder, the incoming mixture being subsequently compressed in the crankcase region by downward movement of the piston on its power stroke. A spark plug 316 of conventional construction is mounted in the head of the cylinder for igniting the mixture above the piston.

The cylinder construction 282 is provided with the conventional mixture bypass (not shown) between the crankcase 292 and the region of the cylinder above the piston which is exposed when the piston is in its lowermost position to convey compressed mixture from the crankcase into the combustion chamber 288. The cylinder construction is also provided with a conventional exhaust port (not shown) for delivering spent or exhaust gases from the combustion chamber when the piston approaches its lowermost position.

The piston skirt 291 is provided with a comparatively small bypass or restricted passage 320 which is in registration with the port 310 when the piston is at and adjacent its lowermost limit of movement, the passage or bypass 320 being shown in registration with the port 310 in FIGURE 10. The bypass 320, being in registration with port 310 during a period in which mixture is being compressed by the piston in the crankcase, provides for transmission of fluid pressure through the manifold passage 312 and the mixture outlet region 54' of the carburetor mixing passage to influence the throttle 94' to be slightly opened from engine idling position by the pressure wave passing through the passage 320.

The pressure causes slight opening movement of the throttle in engine idling position whereby, upon subsequent covering of the port 310 by the upward movement of the piston 290, some air is caused to flow past the edge regions of the throttle valve 94' and into the engine crankcase to scavenge the crankcase of overrich mixture so that an ignitable mixture is delivered into the combustion chamber 288 to continue operation of the engine at idling speeds without stalling.

FIGURE 10 illustrates a modified form of operative connection between the throttle actuating rod 256' and the throttle 94'. Fixedly secured upon a portion of the throttle supporting shaft 96' exteriorly of the carburetor body 40' is an arm or member 324. The arm 324 is fashioned with a circular opening 326 of larger diameter than the portion 258' of the link 256' and into which extends the portion 258'. The opening 326 being of greater diameter than portion 258' provides clearance space to facilitate free or unrestricted movement of the throttle valve 94' to an extent permitted by the clearance space provided by the opening 326.

The rod or link 256' is provided with a portion 257' pivotally connected with a throttle operating trigger 328 which is pivoted upon a pin 242' and which is normally biased in a direction to close the throttle valve 94' under the influence of a spring 330. An abutment pin 332 is mounted on the chain saw support means for anchoring one end of the spring 330 and for limiting the movement of the trigger member 328 when the throttle is moved toward closed position by the spring 330. An abutment screw 266' limits the pivotal movement of member 324 toward engine idling position.

Figure 12:
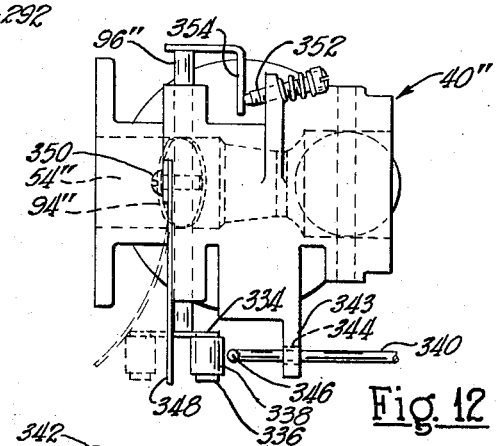
FIGURE 12 is a plan view of the arrangement shown in FIGURE 11.
Figure 11:
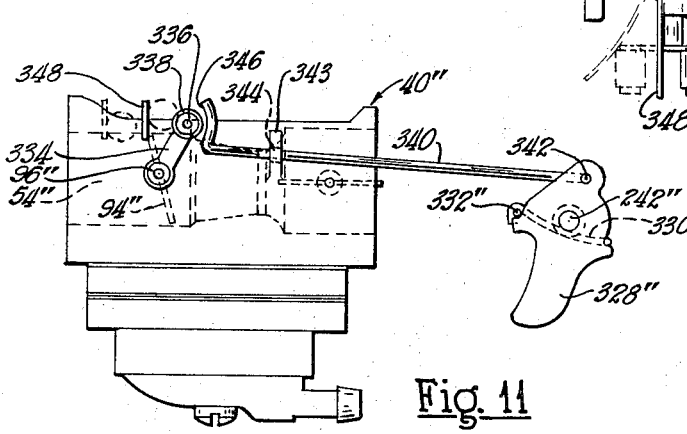
FIGURE 11 is an elevational view of a carburetor illustrating a modified form of throttle control.

FIGURES 11 and 12 illustrate another form of lost motion arrangement between the throttle operating mechanism and the throttle valve.

In this form the carburetor 40" is of the same general character as the carburetor construction hereinbefore described and shown in FIGURES 1 through 5 having a mixture outlet passage 54" in which is disposed a throttle valve 94" secured to a shaft 96" which is journaled in openings in the walls of the carburetor about an axis offset from the axis of the mixture outlet passage.

The throttle actuating mechanism is inclusive of a trigger member 328" which is normally biased toward throttle-closing position by a spring 330", the trigger being pivotally supported on a pin 242". One end of the spring is engaged with an abutment pin 332", the pin also serves to limit the pivotal movement of the trigger 328" toward throttle closing position. Fixedly mounted upon a portion of the shaft 96" extending exteriorly of the carburetor body 40" is an arm or member 334. Journally mounted upon a pin 336 at the distal end of the arm 334 is a roller or anti-friction member 338.

A rod or member 340 has a laterally projecting portion 342 which is pivotally connected with the trigger member 328". The carburetor body is provided with a projection 343 provided with an opening 344 to accommodate and guide the rod 340 for slidable movement. The end region of the rod 340 adjacent the roller 338 is fashioned with an arcuately shaped portion 346 adapted for engagement with the roller 338 to actuate the throttle 94" toward open position upon counterclockwise movement of the trigger member 328" about its pivotal support 242".

The throttle 94" is opened by manipulation of the trigger member 328". It should be noted that a clearance space is provided between the roller 338 and the arcuate portion 346 of the rod 340 when the throttle valve 94" is in near closed engine idling position. This clearance space provides for limited unrestricted or free movement of the throttle valve 94" to facilitate its movement independent of the throttle actuating mechanism to prevent stalling of the engine in the same manner as hereinbefore described in connection with the form of the invention illustrated in FIGURES 1 through 5.

Resilient means is provided adapted to be engaged by the roller 338 when the throttle 94" is moved to open position by the actuation of trigger 328" and the rod 340. A resilient plate or plate spring 348 is secured to the carburetor body 40" by a screw 350. When the throttle valve 94" is at or adjacent engine idling position the plate spring 348 is out of engagement with the roller 338 as shown in FIGURES 11 and 12 to facilitate unrestricted or free movement of the throttle valve as permitted by the clearance space between the plate spring and the roller and between the roller and the arcuate portion 346 of the rod 340.

The function of the plate spring 348 is to bias the throttle valve 94" toward idling position when the operator releases pressure on the trigger 328" and the link 340 moved to its initial position as shown in FIGURES 11 and 12.

It is to be understood that other types of resilient means may be employed for returning the throttle valve 94" toward engine idling position upon release of the throttle actuating mechanism.

The engine idling position of the throttle valve 94" is determined by an adjusting screw 352 which limits the mechanical actuation of the throttle valve 94" toward engine idling position by engaging an arm 354 carried by the opposite end of the throttle supporting shaft 96". It is to be understood that the axis of the throttle shaft 96" is offset or spaced from the longitudinal axis of the mixing passage in the same manner as illustrated in the form shown in FIGURE 2.

FIGURE 7 illustrates a reed valve cage 62' illustrating a different positioning of the unvalved bypass or vent passage to facilitate transmission of the crankcase fluid pressure to the throttle valve. In this form of construction the flange 64' is fashioned with a restricted passage 356 for performing the above-mentioned function, one end of the bypass 356 opening into the crankcase chamber and the opposite end opening into the chamber 70' provided by the hollow interior of the valve cage. The valve cage is provided with ports 78' and cooperating reed valves 80' of the same character as those shown in FIGURE 6.

FIGURE 8 illustrates another position for the bypass or vent between the engine crankcase and the mixture outlet region of the carburetor. In this form the reed cage 62" is provided with reed valves 80a and 80b which cooperate with ports 78" in the manner hereinbefore described. In this form of construction, the reed valve 80a is provided with a port or vent passage 358 for the transmission of fluid pressure between the engine crankcase chamber and the mixture outlet region of the carburetor whereby fluid pressure from the engine crankcase influences the position of the offset throttle valve in preventing stalling of the engine in the manner hereinbefore described.

It is apparent that, within the scope of the invention, modifications and different arrangements may be made other than as herein disclosed, and the present disclosure is illustrative merely, the invention comprehending all variations thereof.

We claim:

1. A fuel feed system for a two cycle engine having a crankcase provided with passage means for admitting combustible mixture into the crankcase during reciprocation of the engine piston including, in combination, a carburetor having a fuel and air mixing passage in registration with said passage means, said carburetor having a fuel chamber, orifice means opening into the mixing passage for delivering fuel from said chamber into the mixing passage, a throttle valve in the mixing passage movable about an axis providing differential areas of the valve defined by the axis, and a bypass channel between the engine crankcase and the mixing passage whereby fluid pressures in the crankcase acting on the differential areas of the throttle valve influence the relative position of the throttle valve.

2. A fuel feed system for a two cycle engine having a crankcase provided with passage means for admitting combustible mixture into the crankcase during reciprocation of the engine piston including, in combination, a carburetor having a fuel and air mixing passage in registration with said passage means, said carburetor having a fuel chamber, orifice means opening into the mixing passage for delivering fuel from said fuel chamber into the mixing passage, a throttle valve in said mixing passage movable about an axis offset from the central axis of the mixing passage, and a bypass channel between the engine crankcase and the mixing passage whereby fluid pressures in the crankcase influence the relative position of the throttle valve.

3. A fuel feed system for a two cycle engine having a crankcase provided with passage means for admitting combustible mixture into the crankcase during reciprocation of the engine piston including, in combination, a carburetor having a fuel and air mixing passage in registration with the passage means, said carburetor having a fuel chamber, orifice means opening into the mixing passage for delivering fuel from said chamber into the mixing passage for engine idling, a throttle valve in the mixing passage movable about an axis providing differential areas of the valve defined by the axis, and a bypass channel between the engine crankcase and the mixing passage whereby pressures in the crankcase acting on the differential areas of the throttle valve influence the position of the throttle valve relative to the orifice means for modifying the amounts of fuel and air delivered into the crankcase during engine idling to prevent stalling.

4. A fuel feed system for a two cycle engine having a crankcase provided with passage means for admitting combustible mixture into the crankcase during reciprocation of the engine piston including, in combination, a carburetor having a fuel and air mixing passage in registration with the passage means, said carburetor having a fuel chamber, orifice means opening into the mixing passage for delivering fuel from said chamber into the mixing passage, an unbalanced throttle valve journally supported in the mixing passage, and a bypass channel between the engine crankcase and the mixing passage whereby varying pressure in the crankcase influences the relative position of the unbalanced throttle valve for modifying the amounts of fuel and air delivered to the engine crankcase.

5. A fuel feed system for a two cycle engine having a crankcase provided with valved passage means for admitting combustible mixture into the crankcase during reciprocation of the engine piston including, in combination, a carburetor having a fuel and air mixing passage in registration with the passage means, said carburetor having a fuel chamber and a fuel inlet, a valve for the inlet, a main orifice and an engine idling orifice opening into the mixing passage for delivering fuel from the fuel chamber into the mixing passage, means in said fuel chamber for actuating said inlet valve to admit fuel from a supply to the fuel chamber when fuel is being delivered into the mixing passage, a throttle valve in the mixing passage, means supporting the throttle valve movable about an axis offset from the longitudinal axis of the mixing passage, said throttle valve being disposed adjacent the idling orifice for limited free movement in engine idling position, and a bypass between the engine crankcase and the mixing passage whereby varying pressure in the crankcase influences the relative position of the throttle valve to modify the amounts of fuel and air delivered into the crankcase during idling of the engine.

6. A fuel feed system for a two cycle engine having a crankcase and means for admitting combustible mixture into the crankcase upon suction strokes of the engine piston including a carburetor having a fuel and air mixing passage in registration with the means for admitting fuel and air mixture into the crankcase, a fuel chamber in the carburetor, a diaphragm forming a wall of the fuel chamber, a fuel inlet valve in the carburetor means transmitting movement of the diaphragm to the inlet valve to control fuel flow from a supply into the fuel chamber, passage means including a main orifice and an engine idling orifice in communication with the fuel chamber for delivering fuel from the chamber into the mixing passage under the influence of aspiration in the mixing passage, a disc type throttle valve in said mixing passage, said throttle valve being mounted for rotation about an axis offset from the central axis of the mixing passage, a throttle actuating means for the throttle valve providing for free movement of the throttle valve when the throttle valve is adjacent engine idling position, and a restricted channel between the mixing passage and the engine crankcase for communicating pressure in the crankcase to the mixing passage for actuating the throttle toward open position to prevent stalling of the engine at idling speeds.

7. A fuel feed system for a two cycle engine having a crankcase provided with passage means for admitting combustible mixture into the crankcase during reciprocation of the engine piston including, in combination, a carburetor having a fuel and air mixing passage in registration with the passage means, said carburetor having a fuel chamber and a fuel inlet valve, means in said fuel chamber for controlling the fuel inlet valve to regulate fuel flow into said fuel chamber, a disc-like throttle valve in said mixing passage, a shaft extending across the mixing passage and supporting the throttle valve, the axis of said shaft being offset from the central longitudinal axis of the mixing passage, fuel channel means in said carburetor including a primary orifice and an engine idling orifice in communication with the fuel chamber for delivering liquid fuel into the mixing passage under the influence of aspiration in the mixing passage, and a throttle actuating means, said throttle actuating means having lost motion connection with the throttle valve whereby the throttle valve has limited free movement when the throttle valve is adjacent the engine idling orifice.

8. A fuel feed system for a two cycle engine having a crankcase provided with valved passage means for admitting combustible mixture into the crankcase during reciprocation of the engine piston including, in combination, a carburetor having a fuel and air mixing passage in registration with the valved passage means, said carburetor having a fuel chamber and a fuel inlet valve, means in said fuel chamber for controlling the fuel inlet valve, a disc-like throttle valve in said mixing passage, a shaft supporting the throttle valve, the axis of said shaft being offset from the central longitudinal axis of the mixing passage, fuel channel means in said carburetor including a primary orifice and an engine idling orifice in communication with the fuel chamber for delivering liquid fuel into the mixing passage under the influence of aspiration in the mixing passage, a throttle actuating means, said throttle actuating means having lost motion connection with the throttle valve whereby the throttle valve has limited free movement when the throttle valve is adjacent the engine idling orifice, and an unobstructed channel between the engine crankcase and mixing passage whereby pressure in the crankcase is effective to bias the throttle valve toward open position to prevent stalling of the engine at idling speeds.

9. Charge forming apparatus including, in combination, a body provided with a mixing passage, a fuel chamber in the body, a fuel inlet in the body, valve means for the fuel inlet, control means for said valve means actuated by reduced pressure in the mixing passage, main and secondary orifices opening into the mixing passage for delivering fuel from the fuel chamber into the mixing passage, a throttle valve disc in said mixing passage, said secondary orifice opening into the mixing passage at the downstream side of the throttle valve, a shaft supporting the throttle valve disc, said shaft having its axis offset from the longitudinal axis of the mixing passage, actuating means for effecting opening and closing movements of the throttle valve, and means limiting movement of the throttle actuating means toward valve closing position whereby the throttle valve has unrestricted freedom of movement adjacent valve closing position.

10. Charge forming apparatus including, in combination, a body provided with a mixing passage, a fuel chamber in the body, a fuel inlet in the body, valve means for the fuel inlet, control means for said valve means actuated by reduced pressure in the mixing passage, main and engine idling orifices opening into the mixing passage for delivering fuel from the fuel chamber into the mixing passage, a throttle valve disc in said mixing passage, said idling orifice opening into the mixing passage at the downstream side of the throttle valve, a shaft extending across the mixing passage and supporting the throttle valve disc, said shaft having its axis offset from the longitudinal axis of the mixing passage, actuating means for manually effecting opening and closing movement of the throttle valve, and means limiting movement of the throttle actuating means toward valve closing position whereby the throttle valve has unrestricted freedom of movement adjacent engine idling position.

11. Charge forming apparatus including, in combination, a body provided with a mixing passage, a recess in the body providing a fuel chamber, a diaphragm forming a wall of the fuel chamber, a fuel inlet in the body, a valve in the fuel inlet, means transmitting movement of the diaphragm to the fuel inlet valve for controlling said valve, a main orifice and an engine idling orifice opening into the mixing passage for delivering liquid fuel into the mixing passage under the influence of reduced pressure in the mixing passage, a throttle disc in the mixing passage, a shaft supporting the throttle disc, said shaft and disc being rotatable about an axis offset from the longitudinal axis of the mixing passage, said engine idling orifice opening into the mixing passage adjacent engine idling position of the throttle, a throttle actuating member, and abutment means limiting movement of the actuating member toward throttle closing position whereby the throttle valve has unrestricted freedom of movement adjacent engine idling position.

12. Charge forming apparatus including, in combination, a body provided with a mixing passage, a recess in the body providing a fuel chamber, a diaphragm forming a wall of the fuel chamber, a fuel inlet in the body, a valve in the fuel inlet, means transmitting movement of the diaphragm to the fuel inlet valve for controlling said valve, a main orifice and an engine idling orifice opening into the mixing passage for delivering liquid fuel into the mixing passage under the influence of reduced pressure in the mixing passage, a throttle disc in the mixing passage, a shaft supporting the throttle disc, said shaft and disc being rotatable about an axis offset from the longitudinal axis of the mixing passage, said engine idling orifice opening into the mixing passage adjacent a near closed engine idling position of the throttle, a throttle actuating member having a lost motion connection with the throttle valve whereby the throttle valve has unrestricted freedom of movement adjacent engine idling position, said offset throttle supporting shaft providing differential areas of the throttle valve subject to fluid pressure in the mixing passage to control engine idling.

References Cited

UNITED STATES PATENTS 2,564,253   8/1951   Fenari.
2,841,372   7/1958   Phillips _____ 123—73 X
3,265,050   8/1966   Tuckey _____ 123—119

RALPH D. BLAKESLEE, *Primary Examiner.*